United States Patent [19]
Rosen et al.

[11] 3,926,732
[45] Dec. 16, 1975

[54] METHOD FOR ASSAYING CATALASE IN MILK AND OTHER LIQUIDS

[75] Inventors: Ernst Anders Carl-Gustaf Rosen; Helena Mariana Rosen, both of Huddinge, Sweden

[73] Assignee: Alfa-Laval AB, Tumba, Sweden

[22] Filed: Feb. 14, 1974

[21] Appl. No.: 442,346

[30] Foreign Application Priority Data
Feb. 16, 1973 Sweden .................................. 22014

[52] U.S. Cl. .................... 195/103.5 R; 195/103.5 C
[51] Int. Cl.² ............................................. C12K 1/04
[58] Field of Search ............... 195/103.5 C, 103.5 R

[56] References Cited
UNITED STATES PATENTS

| 3,066,081 | 11/1962 | Rorem et al. ................ | 195/103.5 C |
| 3,595,755 | 7/1971 | Hartel .......................... | 195/103.5 R |
| 3,627,698 | 12/1971 | Rey et al. ..................... | 195/103.5 R |
| 3,764,479 | 10/1973 | Bergeron et al. ............. | 195/103.5 R |

*Primary Examiner*—A. Louis Monacell
*Assistant Examiner*—C. A. Fan
*Attorney, Agent, or Firm*—Cyrus S. Hapgood

[57] ABSTRACT

To the milk or other catalase-containing liquid, mainly of biological origin, are added a reagent comprising a substance which releases hydrogen peroxide in the presence of a substance available in the milk or other liquid, and another reagent which, upon oxidation by hydrogen peroxide, yields a color reaction, the catalase content being determined qualitatively and quantitatively with the aid of the hue of the color thus produced. A device for carrying out this assay method comprises the two reagents separated physically from each other by a space through which the generated hydrogen peroxide can diffuse and which is capable of admitting the milk or other liquid.

16 Claims, 4 Drawing Figures

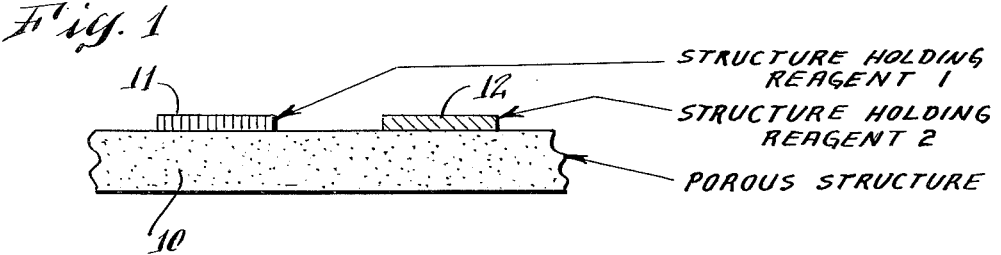
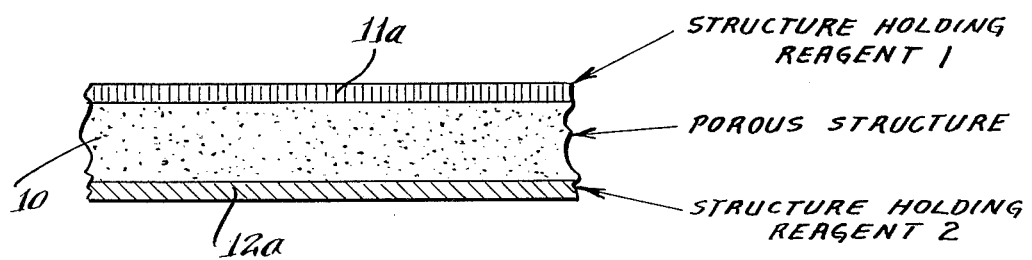
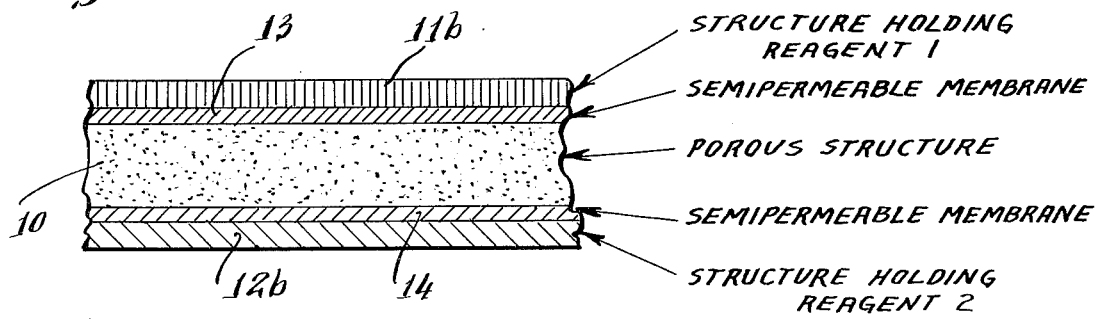
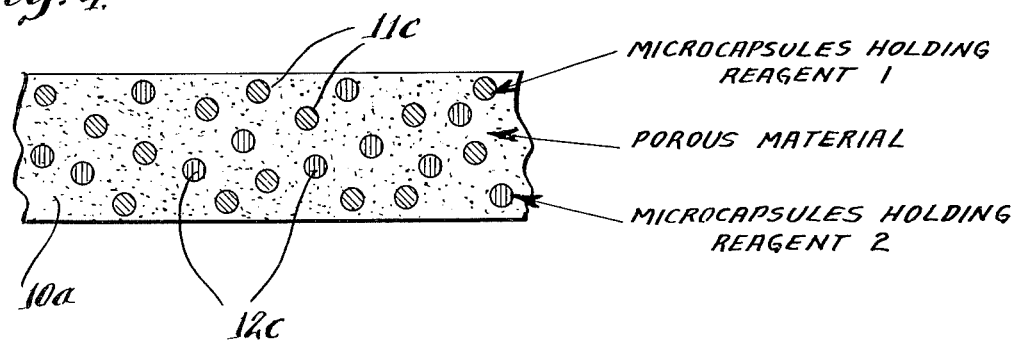

METHOD FOR ASSAYING CATALASE IN MILK AND OTHER LIQUIDS

THE DISCLOSURE

The present invention relates to a method of assaying the enzyme catalase in milk and other liquids, especially those of biological origin such as blood serum. The method is characterized in particular by addition to the milk or other liquid of a substance or synergistic substances capable of generating hydrogen peroxide in conjunction with a substance present in the milk or other liquid, and a further substance which, while itself becoming oxidized by the generated hydrogen peroxide, displays a color reaction enabling the catalase to be assayed from the color hue thus produced. The invention also includes a novel device for use in carrying out the method.

Methods of qualitative and quantitative catalase determinations are known. One of these methods is based on the power of catalase to catalyze the decomposition of hydrogen peroxide, releasing free oxygen. In practice, the liquid under test is mixed with dilute hydrogen-peroxide solution in a fermentation tube, which is then generally allowed to rest for 3 hours before the volume of the released oxygen is read:

$$2H_2O_2 \xrightarrow{\text{catalase}} 2H_2O + O_2 \quad (1)$$

The possibility of assaying catalase in a fast, accurate and simple way is of great importance, especially in milk, as the presence of catalase in milk is an indicative of mastitis, an infections disease of the udder of the milk-producing animal. Being a source of considerable loss to the farmers, it is important that the presence of mastitis be revealed by catalase assay at an early stage through regular controls of the state of the udder.

Owing to the slow character of the above-mentioned method of assaying catalase by adding hydrogen peroxide in a fermentation tube, other methods have been devised. Some of them are based on an assessment of the degree of coagulation or increase in the viscosity of milk to which alkaline or surface-active substances have been added. However, these methods also involve the disadvantage of requiring handling reagents; and their accuracy is low unless very skilled personnel is used for the analytical work, especially at low degrees of mastitis.

In two articles - Z. physiol. Chem. 329 (1962) 40 and Clin. Chim. Acta 15 (1967) 159–163 - Johann Putter described a method of colorimetric detection of catalase by a system of reagents, comprising among other compounds hydrogen peroxide, peroxidase and a leuko dye. According to this method, a quantity of hydrogen peroxide is added to the liquid being analyzed, the catalase that may be present in the liquid is allowed to decompose the hydrogen peroxide, and the reaction is interrupted at certain time intervals, the quantity of the remaining hydrogen peroxide each time being determined by letting it oxidize the leuko dye, using peroxidase as catalyst, according to the formula:

$$\text{Leuko dye} + H_2O_2 \xrightarrow{\text{peroxidase}} \text{dyestuff} + H_2O \quad (2)$$

Obviously, this method as well is too complicated and time-consuming to be used for rapid, yet reliable determinations of catalase by a non-expert staff.

It is therefore an object of the present invention to provide a simple, fast and accurate method of catalase detection.

Since the occurrence of catalase in milk is known to be closely correlated to the degree of mastitis, it is also an object of the invention to provide a simple, fast, reliable, and sensitive method of quantitative catalase determination.

It is also an object of the invention to provide a method involving the above-mentioned advantages and which makes it possible to carry out catalase assays by a color reaction.

Finally, it is an object of the invention to provide a test appliance for use in carrying out the above-described catalase assay and which may be in the form of a strip of paper in which the reagents necessary for the test are absorbed.

According to the invention, the method is carried out by balancing the above-mentioned reaction (2), according to which a leuko dye produces a colored dyestuff by oxidation with hydrogen peroxide, against the above-mentioned reaction (1), according to which catalase decomposes hydrogen peroxide, the last-mentioned reaction consequently inhibiting color reactions like the first-mentioned one.

The provision of a method making it possible to use only a dry test paper cannot be realized by adding hydrogen peroxide, which is both volatile and chemically unstable, to the paper. Hence the hydrogen peroxide must be generated in the liquid under test or in the test paper by incorporating in that paper a substance capable of reacting with a substance present in the liquid, thereby causing hydrogen peroxide to be released. A reagent meeting these requirements is an organic or inorganic peroxide or some compound capable of generating a peroxide.

Another possibility is to utilize an enzymatic reaction for generating the hydrogen peroxide. The opportunities for such an approach are particularly favorable in milk and other liquids of biological origin. For example, xanthine and hypoxanthine together with the enzyme xanthine oxidase present in milk yield hydrogen peroxide.

The most favorable approach, however, is to mix the milk or other liquids of biological origin with an enzyme of synergistic enzymes capable of releasing hydrogen peroxide in the presence of a sugar available in the liquid. Such generation of hydrogen peroxide can be obtained from the lactose in the milk in conjunction with the enzyme galactose oxidase.

However, galactose oxidase is basically specific to free galactose and reacts only slowly with lactose. It is therefore to advantage to add the enzyme β-galactoxidase, which splits lactose into galactose and glucose. Instead of galactose oxidase, or in conjunction with that enzyme, the enzyme glucose oxidase, which is specific to the glucose obtained by the splitting reaction, can be used together with β-galactoxidase.

Hence a useful system for detecting catalase in milk should follow the general lines of the formula below, in which a leuko dye in the presence of peroxidase becomes oxidized catalytically by the hydrogen peroxide generated in the liquid under test, this oxidation being inhibited in the presence of catalase:

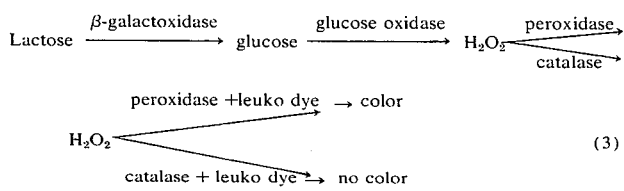

(3)

A strip of paper in which the reagents mentioned are adsorbed should provide a convenient material for applying this system by simply immersing the paper in the liquid under test in the determination of catalase. Another possible material involves a specific structure, such as a gel, to which the reagents are attached. Such a material can be produced in the form of a strip of gel and has been utilized, for instance, in pH determination for a considerable time.

It seems improbable, however, that such a competition for the available hydrogen peroxide could be brought about between catalase and peroxidase. The demonstration by W. E. Knox, reported in Biochem. Biophys. Acta 14 (1954) 117, shows that all generated hydrogen peroxide in a system comprising glucose, glucose oxidase, catalase, peroxidase, and an oxidizable compound, i.e., a hydrogen donor, was consumed during the reaction catalyzed by peroxidase but was not affected by the presence of catalase. As a result, it has been common belief that enzymatically generated hydrogen peroxide is generally handled by the peroxidase irrespective of catalase being present. This belief found further support from the fact that despite its power of metabolizing its substrate at a very much higher rate than other enzymes do, catalase shows a very low affinity to the substrate, whereas peroxidase has a high affinity to its substrate and has been shown most efficiently to utilize enzymatically generated hydrogen peroxide present in very low concentration.

It is surprising, therefore, that the new system and the reaction (3) operate usefully. The difference between their results and those published by Knox and others may be attributed, at least in part, to the latters' using certain naturally occurring hydrogen donors whereas the present invention utilizes synthetic dyes. The enzymatic generation of the hydrogen peroxide in situ leads to a comparatively constant concentration of the hydrogen peroxide, which is a prerequisite to the utilization of the competitive degradation of hydrogen peroxide by peroxidase and catalase in assaying the catalase content.

We have carried out a great number of tests by which catalase has been assayed as described above. The mixtures of reagents applied, as stated in formula (3), in conjunction with the liquid samples, have resulted in the occurrence of dark-blue or greenish colors in the absence of catalase. With high percentages of catalase present, pale-yellow colors have developed. The sensitivity is inversely dependent on the peroxidase content of the reagent mixture. We have succeeded in adjusting the sensitivity during our tests on milk so that with milk from a completely healthy cow, the color reaction was dark blue whereas milk from cows arranged in order of increasing severity of mastitis resulted in colors ranging from medium blue light bluish green to pale yellow.

The paragraphs below disclose examples of reagent mixtures containing the substances suggested above, and methods for their application in assaying catalase in milk. One drop of milk is to be mixed with one drop of a reagent solution made up according to one of the following alternatives:

| Alternative 1 | β-galactoxidase | 0.1 mg/ml |
|---|---|---|
| | glucose oxidase or | |
| | galactose oxidase | 0.1 mg/ml |
| | peroxidase | 1.0 μg/ml |
| | o-tolidine | |
| Alternative 2 | Galactose oxidase | 0.1 mg/ml |
| | peroxidase | 1.0 μg/ml |
| | o-tolidine | 0.2 mg/ml |
| Alternative 3 | Hypoxanthine | 0.1 mg/ml |
| | peroxidase | 1.0 μg/ml |
| | o-tolidine | 0.2 mg/ml |
| Alternative 4 | Sodium perborate or | |
| | urea peroxide | 1.0 mg/ml |
| | peroxidase | 1.0 μg/ml |
| | o-tolidine | 0.2 mg/ml |

This technique may be replaced by using, for instance, a strip of filter paper soaked in one of the above-mentioned solutions and dried. When subsequently immersed in the milk for the purpose of assaying milk catalase, it will absorb a quantity of milk that matches the amount of reagent present in the strip.

The peroxidase employed can be of normal commercial purity (e.g., RZ = 0.6). The glucose oxidase and galactoxidase preparation, on the other hand, have to be special grade with a low catalase content. To ensure reagent stability they should be dissolved in an adequate buffer solution close to pH 7.

The sensitivity of the single-phase reagent system is sufficiently high to detect a developed inflammatory process of the udder, known as an acute mastitis, and its stage of development. However, this single-phase system has proved to be insufficiently sensitive to allow a reliable ocular detection in those early stages of the inflammatory process ("subclinical mastitis") which are of particular diagnostic interest; but these stages can be detected photometrically, using the single-phase system described.

It has been shown that the sensitivity of the analytical method can be increased to the necessary level by developing it into a multi-phase system in that the reagents generating hydrogen peroxide and dyestuff, respectively, are separated physically from each other by means of a space through which the generated hydrogen peroxide can diffuse, and which is also capable of admitting the milk. During its passage from the hydrogen peroxide-generating phase of the system, through the separating space and into the dye-generating phase of the system, the hydrogen peroxide has enough time for total or partial decomposition, should catalase be present in the milk that has penetrated or been brought into said space.

Thus, by arranging a diffusion path for the generated hydrogen peroxide through the liquid under test, from the hydrogen peroxide-generating enzyme to the dye-generating system, containing mainly a catalyzing enzyme, it is now possible to detect even very small amounts of catalase and hence mastitis at an initial stage of development.

The following are examples of practical applications of the method according to the present invention:

EXAMPLE 1

A test cell is fitted with two compartments, one of which is permanently closed by a semipermeable membrane and contains 1 – 10 u of galactose oxidase (as counted on lactose as the substrate). A small amount, 0.5 – 1 ml, of the liquid to be analyzed for catalase is added in the open compartment of the test cell. A test paper, containing peroxidase and a leuko dye as described in Example 2 (below), is arranged in the liquid in such a way that its nearest part remains at a fixed distance of a few mm from the semipermeable membrane. Various sensitivities to catalase can be attained, depending on the amount of galactose oxidase, the sample volume, and the fixed distance mentioned. With an arrangement as described, it has been possible to carry out semi-quantitative determinations of catalase concentrations of approximately 2 – 20 U/ml by observing the development of color in the test paper, which is maximum after a few minutes in the absence of catalase but attains gradually weaker intensity the higher the catalase concentration.

EXAMPLE 2

The hydrogen peroxide-generating system is applied to one side of a porous structure, the color-generating system being applied to its other side. The porous structure will thus form the space separating the two systems. It can absorb liquid to be analyzed and constitutes the diffusion path for the hydrogen peroxide. The separating space thus formed may be reinforced by a semipermeable membrane, isolating the systems from each other. The porous structure may consist of one or more layers of porous paper.

The two reagent applied may be applide by being fixed in layers of gel. The two following solutions are prepared at about 40° C, preferably in 20 – 40 per cent gelatin or some other gel-forming preparation:

| | |
|---|---|
| Solution 1 | Peroxidase (EC 1.11.1.7, RZ 0.6) 0.5 mg/ml<br>o-tolidine 0.5 mg/ml<br>buffer salt yielding an almost neutral pH, such as phosphate |
| Solution 2 | Galactose oxidase (EC 1.1.3.9, about 20 U/mg, with lactose as substrate, non-catalase) 0.5 – 5 mg/ml<br>buffer salt as above |

EXAMPLE 3

Instead of arranging the two enzyme systems on each side of a porous layer by enclosing them in separate gel layers, it is also possible to arrange two porous layers (for instance, of paper) following adsorption of one system in each, on both sides or in some manner in different parts of a third porous layer, which may also be of paper. The two layers carrying the reagents are preferably isolated from the intermediate layer by means of semipermeable membranes.

EXAMPLE 4

Instead of being enclosed in gel layers, the reagents according to Example 2 may be encapsulated in so-called microcapsules according to any of the methods described in the literature. Cf., for example, Chang, T. M. S., MacIntosh, F. C., and Mason, S. G. — Semipermeable Aqueous Microcapsules — Can. J. Physiol. Pharmacol, 44 (1966) 115. Prepare two solutions similar to those described in Example 2. The solutions are enclosed separately in individual microcapsules, which are then placed in different layers on each side of a porous diffusion layer or mixed with an inert diffusion medium, such as cellulose fibers, the mixture finally being formed into a porous structure.

EXAMPLE 5

The semipermeable membranes of Example 3 may be omitted if the enzymes used are fixed (insolubilized) on each side or in various part of a porous structure in such a way as to be without immediate contact with each other. Any of the methods for attaching enzymes, for instance to paper as described in the literature, may be applied. Cf., for example, Stasiw, R. O., Patel, A. B., and Brown, H. D. — Utilization of Bound Lactase in Clinical Chemistry - Biotechnol. Bioeng. 14 (1972) 629.

When stated in the Examples that the various enzyme systems are to be arranged in some way in different parts of a porous structure, this must not be construed as implying only an arrangement at each end of a strip of paper but also an attachment to various component parts of the porous structure or various elements which can be used in forming such structure. The latter case is referred to in Example 4. There, the microcapsules containing the reagents are components of the structure created when, according to one technique, they are mixed with an inert diffusion medium, after which the mixture is formed into a porous structure.

Example 1 above describes an actual experimental set-up and a manner of using it according to the invention. Methods more suitable for commercial use are described in Examples 3–5.

In the accompanying drawing,

FIGS. 1 through 4 are sectional views of different forms of the new test device for use in carrying out the assay method.

Referring to FIG. 1, the device there shown comprises a porous body 10, which may be a strip of paper, a layer 11 of gel containing the first reagent, i.e., the hydrogen peroxide-generating system, and a layer 12 of gel containing the second reagent, i.e., the reagent which is oxidizable by the hydrogen peroxide to yield the color reaction. The two gel layers 11 and 12, as shown, are affixed in spaced relation to each other on the same side of the paper strip 10.

In FIG. 2, the two gel layers 11a and 12a containing the respective reagents are affixed directly to opposite sides of the porous strip 10; and in FIG. 3 the two layers 11b and 12b carrying theh respective reagents are isolated frqm the porous strip 10 by semipermeable membranes 13 and 14, respectively. These two test devices are in accordance with Examples 2 and 3 above.

The layers 11–12, 11a–12a and 11b–12b, instead of being gel layers, may be porous layers (such as paper) in which the respective reagents are absorbed.

The device of FIG. 4, which is in accordance with Example 4 above, comprises microcapsules 11c and 12c containing the two reagents, respectively, and distributed in the porous body 10a. The latter may be formed by mixing the two groups of microcapsules 11c–12c with cellulose fibers and then forming the mixture into a self-sustaining strip.

In the following claims, it will be understood that reference to a "substance" which functions to release hydrogen peroxide, in the presence of another substance in the catalase-containing liquid, is intended to include synergistic substances.

We claim:

1. A method for qualitative and quantitative determination of catalase in a liquid, said method comprising the steps of adding to the liquid a first reagent comprising a substance which releases hydrogen peroxide in the presence of another substance in said liquid, adding to the liquid a second reagent oxidizable by hydrogen peroxide to yield a color reaction, said oxidation by hydrogen peroxide being inhibited by the presence of catalase, whereby said color reaction is stronger with a smaller catalase content of the liquid, and determining the catalase content with the aid of the hue of the color thus produced.

2. The method of claim 1, in which said first reagent is a peroxide.

3. The method of claim 1, in which said first reagent is a compound capable of generating a peroxide.

4. The method of claim 1, in which said other substance in the liquid is xanthine oxidase.

5. The method of claim 1, in which said first reagent includes an enzyme.

6. The method of claim 1, in which said first reagent is the enzyme galactose oxidase.

7. The method of claim 1, in which said substance of the first reagent is made up of synergistic substances consisting essentially of the enzymes β-galactoxidase and glucose oxidase.

8. The method of claim 1, in which said substance of the first reagent is made up of synergistic substances consisting essentially of the enzymes β-galactoxidase and galactose oxidase.

9. The method of claim 1, in which said second reagent is a leuko dye.

10. The method of claim 1, comprising also adding to said liquid the enzyme peroxidase.

11. The method of claim 1, wherein said two reagents are added while physically separated from each other by a space through which said released hydrogen peroxide diffuses and to which said liquid is admitted.

12. The method of claim 1, wherein said two reagents are added by maintaining the reagents separated from each other while attached to a porous body, and introducing the liquid into the porous body.

13. The method of claim 12, comprising also enclosing the two reagents separately in respective gel layers, and attaching the two gel layers apart from each other to the porous body.

14. The method of claim 12, comprising also adsorbing the two reagents separately in respective porous layers, and attaching the two porous layers apart from each other to the porous body.

15. The method of claim 12, comprising also separately microencapsulating each of the two reagents, forming a mixture of the separate microcapsules and an inert diffusion medium, and forming said mixture into said porous body.

16. The method of claim 12, comprising also separately microencapsulating each of the two reagents, and attaching the microcapsules separating to said porous body.

* * * * *

UNITED STATES PATENT OFFICE
CERTIFICATE OF CORRECTION

PATENT NO. : 3,926,732
DATED : December 16, 1975
INVENTOR(S) : Ernst Anders Carl-Gustaf Rosen et al It is certified that error appears in the above-identified patent and that said Letters Patent are hereby corrected as shown below:

Col. 1, line 34, "infections" should be replaced by --infectious--.

Col. 2, line 20, "absorbed" should be replaced by --adsorbed--.

Col. 5, line 39, should be changed to --The two reagent systems may be applied by being--.

Col. 6, line 55, "theh" should be replaced by --the--.

Col. 6, line 61, "absorbed" should be replaced by --adsorbed--.

Claim 16, line 3, "separating" should be replaced by --separately--.

Signed and Sealed this

Thirteenth Day of July 1976

[SEAL]

Attest:

RUTH C. MASON
*Attesting Officer*

C. MARSHALL DANN
*Commissioner of Patents and Trademarks*